United States Patent [19]

Price et al.

[11] Patent Number: 5,720,345
[45] Date of Patent: Feb. 24, 1998

[54] CASING JOINT DETECTOR

[75] Inventors: Timothy M. Price, Templeton; Donald H. Van Steenwyk, San Marino, both of Calif.

[73] Assignee: Applied Technologies Associates, Inc., Paso Robles, Calif.

[21] Appl. No.: 596,458

[22] Filed: Feb. 5, 1996

[51] Int. Cl.$^6$ .................................................. E21B 47/09
[52] U.S. Cl. .................................. 166/254.2; 166/255.1; 166/66.5
[58] Field of Search ......................... 166/66, 255.1, 166/255.2, 254.2, 54.1, 66.5

[56] References Cited

U.S. PATENT DOCUMENTS

| | | | |
|---|---|---|---|
| 3,396,786 | 8/1968 | Schuster et al. | 166/4 |
| 3,434,046 | 3/1969 | Wilson et al. | 324/34 |
| 3,570,594 | 3/1971 | Hamilton | 166/64 |
| 3,913,398 | 10/1975 | Curtis | 73/152.33 |
| 4,071,815 | 1/1978 | Zemanek, Jr. | 324/8 |
| 4,320,340 | 3/1982 | Lichtenberg | 324/221 |
| 4,342,911 | 8/1982 | French | 250/258 |
| 4,465,140 | 8/1984 | Hoehn, Jr. | 155/381 |
| 4,556,884 | 12/1985 | Howells et al. | 340/855.3 |
| 4,662,209 | 5/1987 | Brown | 340/854.2 |
| 4,737,636 | 4/1988 | Smith, Jr. | 250/269.7 |
| 4,766,764 | 8/1988 | Trevillion | 73/151 |
| 4,808,925 | 2/1989 | Baird | 324/221 |
| 5,112,126 | 5/1992 | Graebner | 356/141.5 |
| 5,279,366 | 1/1994 | Scholes | 166/254.2 |
| 5,283,520 | 2/1994 | Martin et al. | 324/220 |
| 5,361,838 | 11/1994 | Kilgore | 166/255 |
| 5,546,672 | 8/1996 | Campbell et al. | 33/716 |

FOREIGN PATENT DOCUMENTS

| | | |
|---|---|---|
| 0013494 | 7/1980 | European Pat. Off. . |
| 2098332 | 11/1982 | United Kingdom . |

*Primary Examiner*—Frank Tsay
*Attorney, Agent, or Firm*—Christie, Parker & Hale, LLP

[57] ABSTRACT

A borehole instrument that detects the joints of successive axial lengths of magnetic material enclosing a borehole while traveling along the inside of the enclosure by detecting anomalous magnetic fields indicative of the enclosure's joints. One embodiment of the invention is to measure the distance the instrument travels along the inside of the borehole enclosed or cased with a magnetic material by traversing along a borehole while measuring one or more magnetic field parameters interior to the enclosure of the magnetic casing, processing the measured parameters to detect anomalous static magnetic fields that are indicative of the joints of the casing lengths; determining the distance traveled along the borehole at each joint by summing the known lengths of the casing; correlating the discrete distances computed at the casing joints with a primary distance measuring device that is higher resolution but lower in accuracy, and calibrating the primary device using the discrete distances known at the casing joints. Further embodiments include detecting pre-magnetized enclosures or implanted magnetic markers.

19 Claims, 5 Drawing Sheets

5,720,345

CASING JOINT DETECTOR

BACKGROUND OF THE INVENTION

1. Field of the Invention

The present invention relates generally to the measurement of borehole depth travelled by wireline tool or other logging device by magnetic detection of casing joints. More particularly, the invention provides a method and apparatus for use of a passive magnetic detection approach using a magnetometer to detect the magnetic anomaly created by the casing joint or specifically mounted magnetic tags, and tallying the detection with known spacing of the joint or tag to calculate distance traveled by the tool. Detection of the anomaly is accomplished by measurement of variation of the axial field component, orthogonal field components or a combination of both using one or more magnetometers aligned with those field components. Additional sensitivity is obtained by mounting two magnetometers aligned with the borehole axis of the tool with the magnetometers spaced to allow gradient measurement.

2. Prior Art

It is generally well known that the measurement of the distance a borehole instrument travels in a borehole is important for many reasons specific to the function that the instrument performs. For a borehole position surveyor used in the oil industry, the along hole depth (AHD) is one component used in computing position of the borehole in the earth. For formation logging instruments, accurate AHD is required for proper correlation between depth and measured geological formation parameters. It is further well known that many methods used for determining distance traveled along the borehole are subject to systematic errors. For wireline depth measurement devices, errors such as cable stretch, encoder inaccuracy and inconsistency in tension that the instrument maintains on the wireline can all contribute to uncertainties in the measured distance the instrument travels.

These uncertainties encouraged the development of devices known as casing collar locators. The casing collar locator is a mechanism that attaches to a borehole instrument and detects the presence of the casing joints. Since the joint depths are known by summing the known individual lengths of casing sections, the borehole instruments depth is known at the time the casing joint is detected. Concurrent to recording collar detection's, a primary depth measurement device measures an independent depth at both the casing joints as well as points in between. A correction for the primary depth is computed by comparing the primary depth at the time the casing collar locator detects a joint to the joint depth computed for that specific joint. This correction is then applied to all primary depth measurements both those at the joints as well as those between the casing joints.

The most commonly used collar detectors generally use the effect that an active magnetic field generated by a permanent magnet or electromagnet has with the magnetic path of the casing to detect the increase thickness of the casing collar or the air gap between the casing sections. These methods can suffer from low signal to noise ratio, and velocity sensitivity of the signal amplitude. In applications where small diameter instruments are required because of borehole size restrictions, the magnetics and coils required to implement these active methods become prohibitively large. Applications where the instruments must be powered by batteries such as non electric line surveyors and logging instruments, power consumption of the electromagnet devices reduces battery life significantly.

It is therefore desireable to provide a method for detecting the joints between successive axial lengths of magnetic casing or other enclosures, while traveling along the inside of the said casing by passively measuring the anomalous magnetic field indicative of the casing joints. It is further desireable to provide such detection independent of the velocity of the detector to eliminate the sensitivity of conventional detector's output amplitude to the velocity that the detector is traveling in the borehole. Another desireable feature is to overcome the limitations imposed by prior art devices by eliminating magnets in permanent magnetic devices and removing the requirement for recharging of those magnets, and eliminating electromagnets thereby reducing power consumption, both of which also eliminate unwanted magnetic fields around the nearby logging instruments in the tool and minimize the space required for the apparatus.

SUMMARY OF THE INVENTION

Typical magnetic casing used in boreholes have been found to have remnant magnetic fields apparent at the joints between casing lengths. Although they are apparent on axes both cross borehole and along borehole, the anomalies have the largest amplitude along the axis of the borehole. The present invention measures one or more magnetic field parameters inside the borehole drill collar or casing using a vector or total field magnetometer that outputs a signal proportional to the ambient field in the borehole. This magnetic field measurement is continuously logged as the apparatus travels along the borehole. Abrupt Changes in amplitude of the magnetometer output as the tool passes by the magnetic discontinuity present at the interface of the casing sections electrically indicates the casing joint. Detection of the magnetic discontinuity is then tabulated with a known set of distances between the casing joints and a calculation is made to determine actual borehole position. In addition to a primary depth system correction, the detection of the casing joint can then be used in many well known applications as described in U.S. Pat. No. 3,396,786 to Schuster et al and U.S. Pat. No. 3,434,046 to Wilson et al.

BRIEF DESCRIPTION OF THE DRAWINGS

The method and apparatus of the present invention is more clearly understood when described with respect to the following drawings wherein.

DETAILED DESCRIPTION

Figure 1:
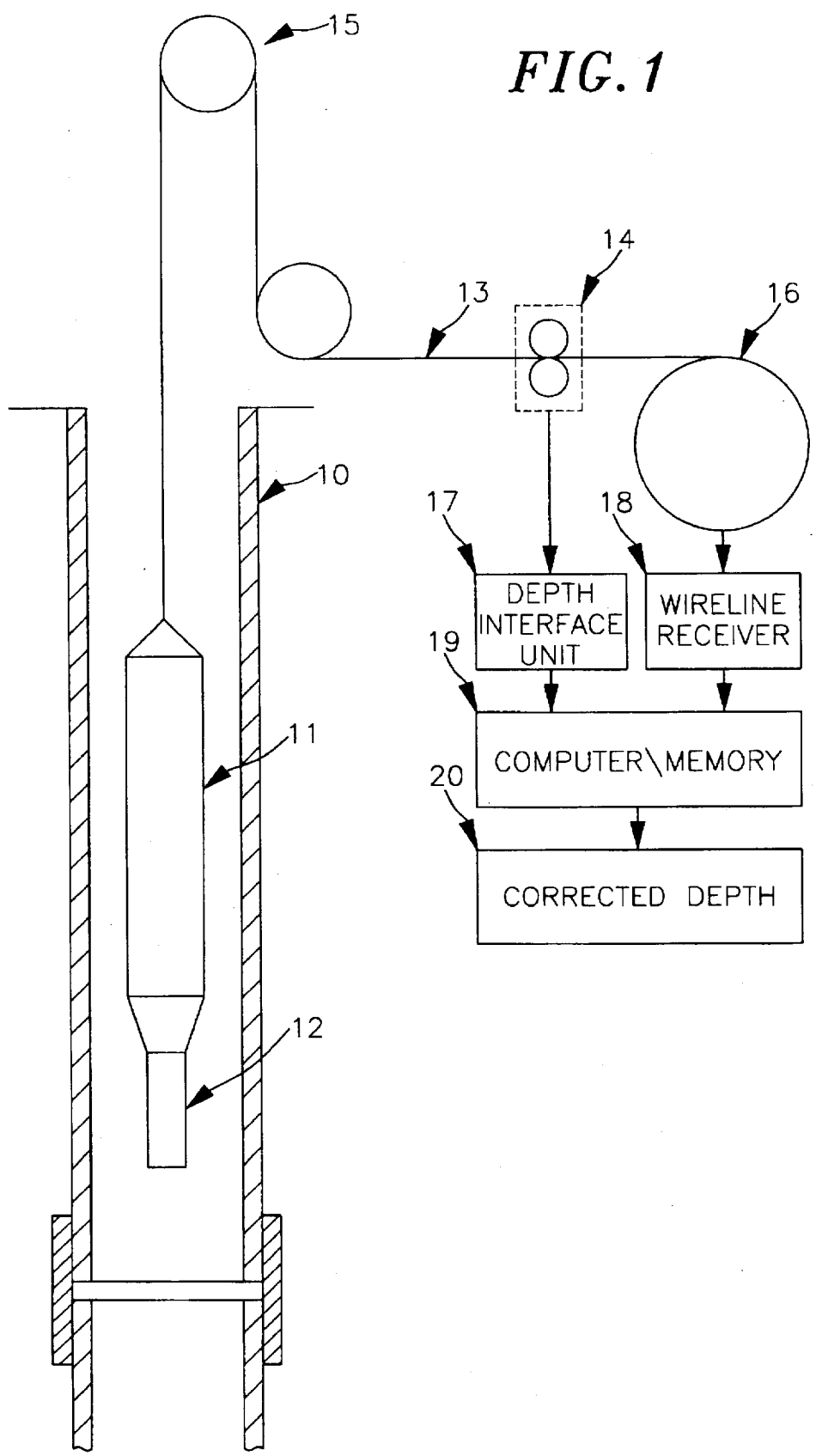
FIG. 1 is a diagram showing a typical wireline measuring system in which the present invention is mounted.

The preferred application of this invention is portrayed in FIG. 1. FIG. 1 shows a typical wireline system used in a borehole. The casing joint detector (CJD) 11 is lowered down casing string 10 using wireline 13. The wireline is controlled by a pulley suspension system 15 above the borehole and winch 16 which spools and unspools the wireline. Attached to the CJD is a survey or logging apparatus 12. At the surface of the Earth are the wireline depth measurement device 14 which measures the length of wireline unspooled from the winch and therefore the distance that the survey or logging apparatus have traveled along the casing string. Using the depth interface unit 17, computer\memory device 19 reads the wireline depth from the depth measurement device Concurrently, the computer\memory reads from wireline receiver 18 the data transmitted electrically over the wireline by the CJD. The computer\memory processes and outputs a corrected depth 20 which removes the systematic errors in the wireline depth measurement.

Figure 2A:
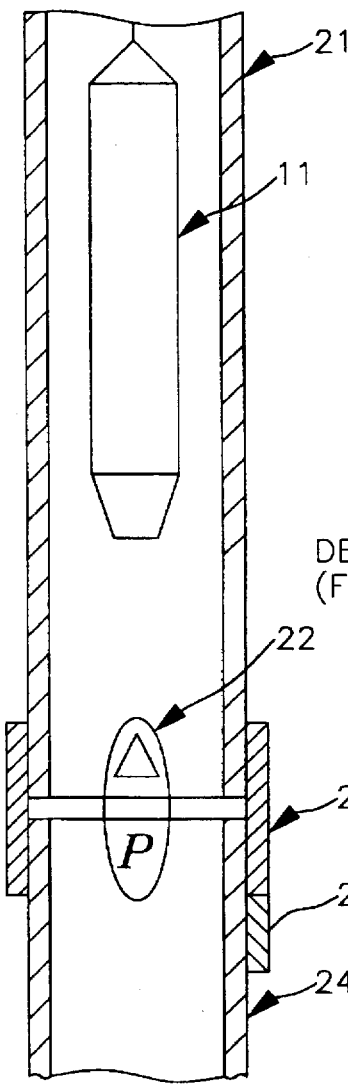
FIG. 2A is a section view of a casing joint, a casing joint detector according to the present invention and the associated magnetic discontinuity at the joint.
Figure 2B:
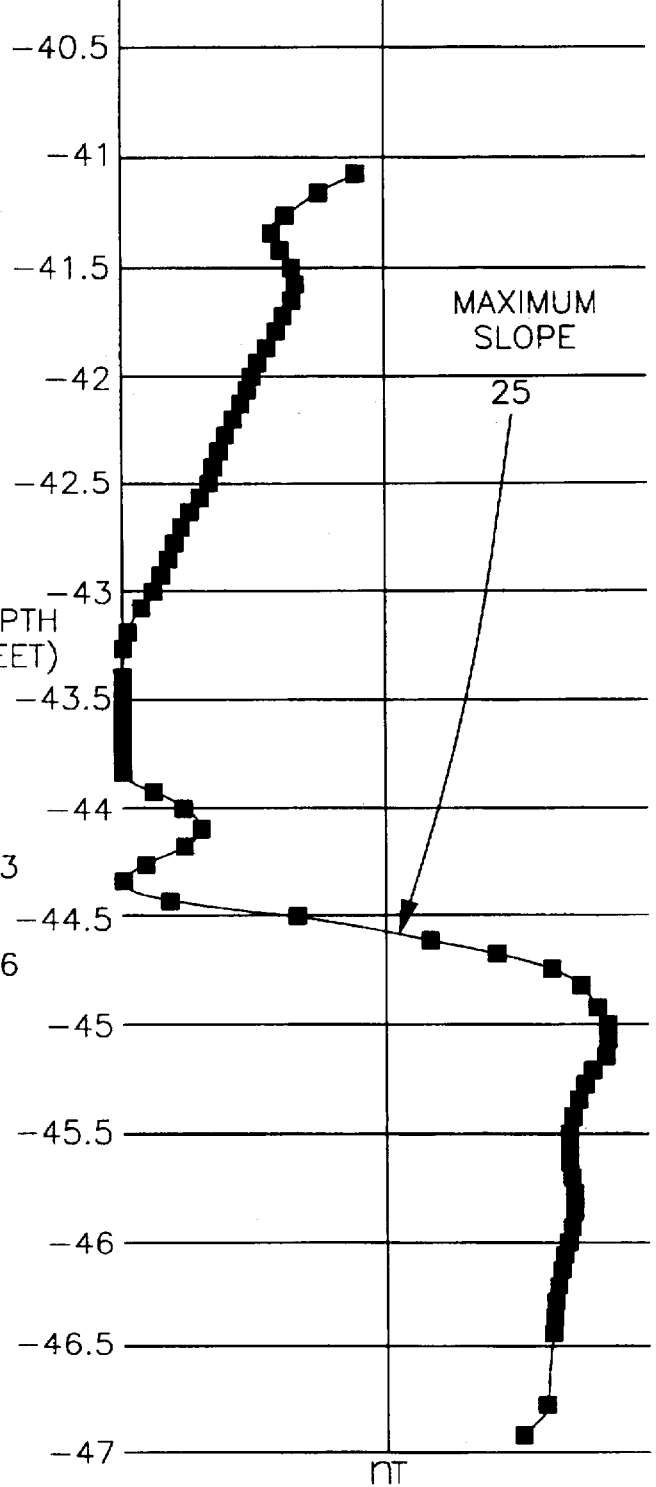
FIG. 2B is a plot of the axial magnetic field in relation to the casing section of FIG. 2A.

The primary physical mechanism used to detect the casing joints is displayed in FIG. 2A and 2B. FIG. 2A depicts an upper casing section 21 and a lower casing section 24 connected together by a coupler 23. A magnetic discontinuity AP 22 existing at the casing joint is measured by the magnetometer based CJD 11 while traversing through the upper and lower casing section. As the magnetometer passes by the casing joint the output from the magnetometer typically takes a polarity reversal caused by an apparent difference in polarization of the two casing sections. A log of the magnetometer output plotted versus depth is displayed in FIG. 2B. The magnetic field inside the casing changes at a maximum rate 25 at the interface between the upper and lower casing section 21 and 24 respectively. Experimental data has shown that the magnetometer output's maximum rate of change indicates the joint of the casing.

Figure 3:
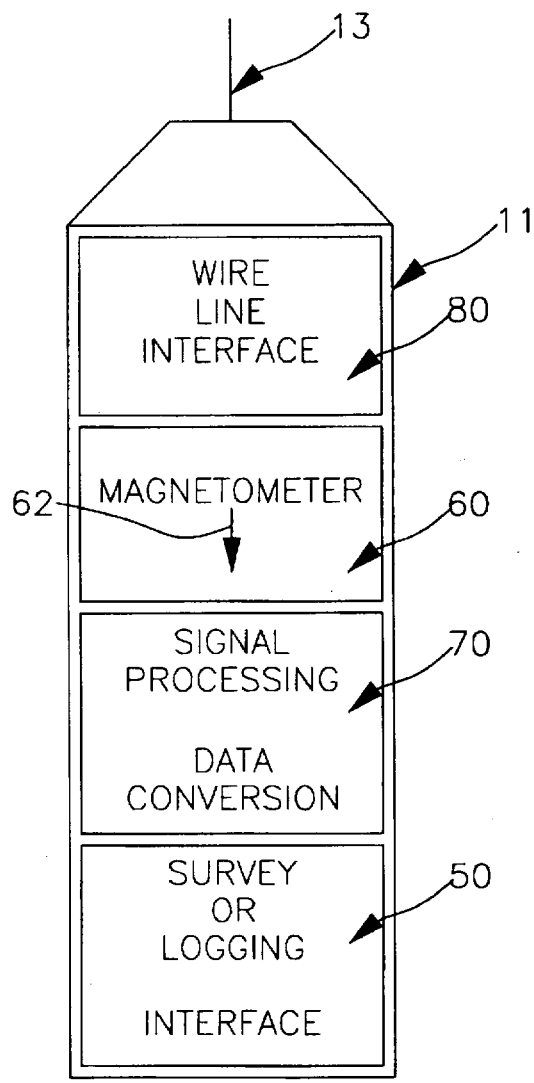
FIG. 3 is a diagram of the functional blocks of the casing joint detector.

A detailed block diagram of the CJD apparatus is shown in FIG. 3. The magnetometer 60 and associated circuitry are mounted in the structure of CJD 11 that is lowered down the borehole on the wireline. In addition to being the means for lowering the CJD down the borehole, the wireline also supplies power and the communication channel to the surface. Connection of a survey or logging tool is accomplished through a survey and logging tool interface 50. One or more components of the magnetic field inside the casing are measured by magnetometer 60 and converted to a digital format by signal processing and data conversion circuitry 70. Transmission of the data to the surface is achieved using wireline interface 80 which provides a standard approach, such as frequency shift keying, for signal transmission to the surface. In this embodiment, the joint detection is determined and the correction of the wireline depth measurement device is performed by the surface processing system.

Figure 4:
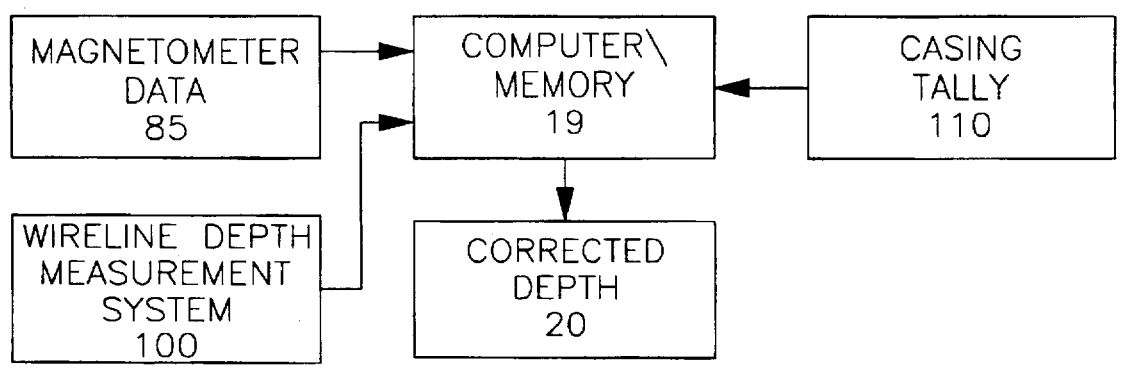
FIG. 4 is a block diagram of the surface processing system.

FIG. 4 displays a block diagram of the surface processing system. Both the incoming magnetometer data 85 and the depth from the wireline depth measurement system 100 are logged by the computer\memory device 19. A third input to the computer is an ordered list, known as a casing tally 110, of the casing lengths measured before the casings were set in the borehole. Using the magnetometer data, the wireline depth and the casing tally, a corrected depth 20 is output by the computer\memory device. The details of this process are as follows. Using the casing tally the casing joint depth is computed by:

$$\text{Depth\_cj}(N) = \sum_{n=1}^{N} \text{tally\_length}(n)$$

where,

Depth_cj≡Casing Joint Depth.

tally_length(n)≡The incremental length of the nth casing section.

N≡The number of casings between the joint that the depth is computed for and the surface of the well.

Using the magnetometer data, the computer determines the wireline depth of the casing joint by selecting the wireline depth that correlates to the maximum rate of change of the magnetic field. A wireline depth error is computed by:

$$Wd_e(n) = Depth_{wl}(n) - Depth_{cj}(n)$$

Where,

Wd_error≡The wireline depth error.

Depth_wl≡The depth measured by the wireline depth measurement system at the detected casing joint.

Figure 7A:
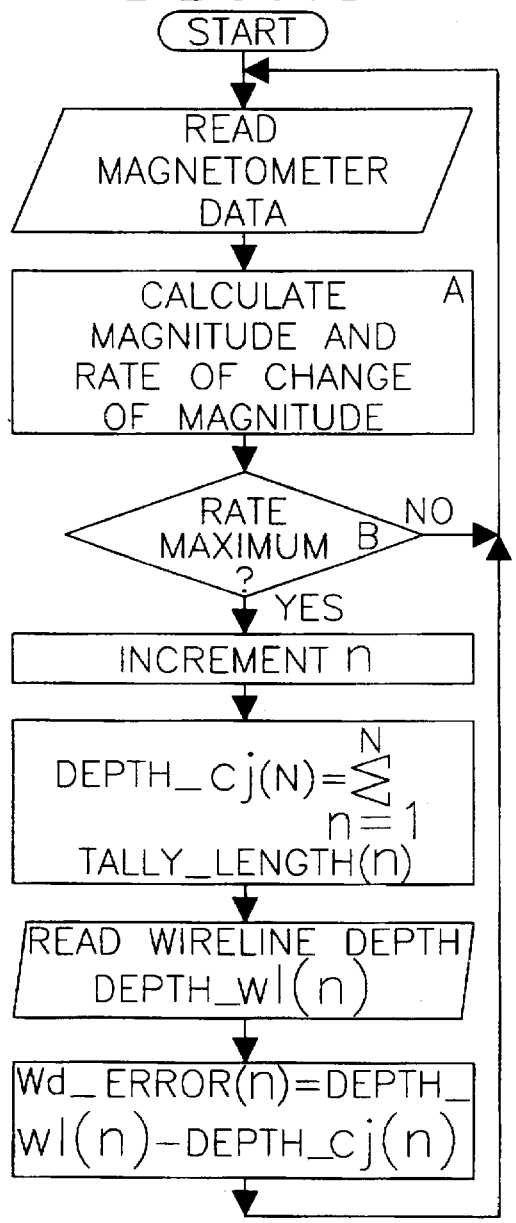
FIG. 7A is a flow chart of computer operation for calculation of borehole depth and wireline depth error using the casing joint detector input for field magnitude and rate of change of magnitude.

As the CJD translates along the borehole, the wireline depth error is computed at each detected casing joint. Using this series of wireline depth errors, a scaling and offset correction is computed for the wireline depth measurement system that is valid over the entire casing string including measurement in between the casing joints. A flow chart of operation of the computer to conduct the calculations described is shown in FIG. 7A.

In the embodiment disclosed in the drawings a second harmonic saturable ring core magnetometer, also known as a flux gate magnetometer, with a single axis of sensitivity is employed in combination with a closed loop servo electronics interface that outputs a voltage proportional to the magnetic field present along the sensitive axis. As shown in FIG. 3, the sensitive axis of the magnetometer, designated by arrow 62, is aligned to measure the magnetic field along the long axis of the borehole tool which will be substantially coincident with the long axis of the borehole casing. Since the desired measurements are mainly variations from a baseline or ambient magnetic field, the absolute accuracy of the magnetometer is less important than the sensitivity. The magnetometer of the present embodiments of the invention has a full scale range of 150,000 nT with a sensitivity of 15000 nT/Volt and a bandwidth of 120 Hz. Physical size of the device is 0.688×0.688×0.350 inches.

The lack of absolute accuracy requirements of the present invention relaxes normal rigid accuracy specifications required of most magnetometers. Flux gate magnetometers rejected from normal production runs due to reduced accuracy may be employed in the present invention.

As an alternative to the flux gate magnetometer, other embodiments of the invention employ proton precession scalar magnetometers. Exemplary of this type of magnetometer is the EG&G Geometrics G-856 modified to separate the detector and signal electronics from display and control systems.

Figure 5:
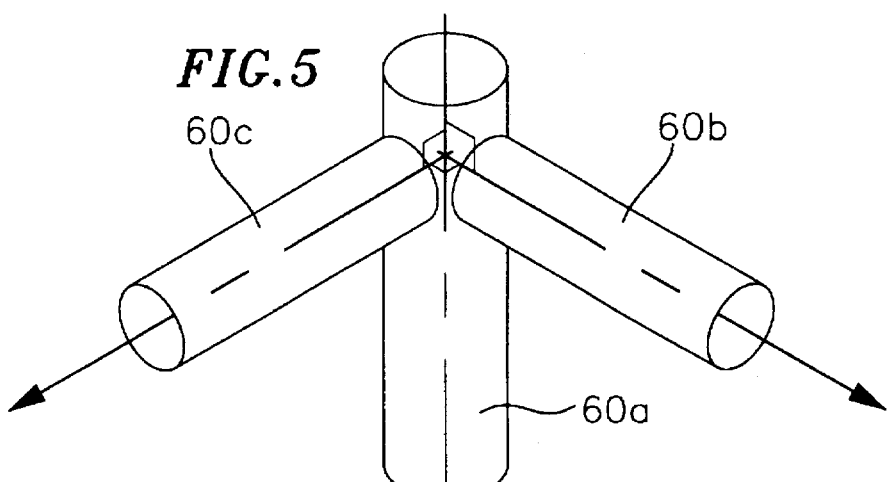
FIG. 5 is a block diagram of an embodiment of the invention employing three magnetometers mounted with sensitive axes mutually orthogonal for total field measurement.

In the embodiment shown in FIG. 3, the preferred alignment of the flux gate where the signal strength is greatest is with the sensitive axis of the flux gate along the axis of the casing. A significantly reduced but usable signal strength is typically found in the plane orthogonal (cross axis) to the casing long axis. Consequently, mounting of a cross axis magnetometer aligned with its sensitive axis along this cross axis plane to measure one of the two independent magnetic field components provides a secondary signal for detection of a magnetic anomaly. As shown in FIG. 5 mounting of one or two orthogonal magnetometers 60b and 60c in the cross axis plane in addition to the borehole axis magnetometer 60a constitute alternative embodiments for employing the present invention. Improved signal to noise ratio is accomplished by calculation of total field strength using two or three orthogonal magnetometers for measurement of two or three orthogonal field components.

Active detection techniques employed in the prior art detect changes in magnetic path. Consequently, significant noise is developed when an active detection device is run in a highly dynamic environment. As the source and receiver coils change proximity with respect to the magnetic casing, the path of the magnetic field is disturbed developing noise, reducing signal to noise ration and degrading the ability of the device to detect casing joints.

The present invention eliminates this type of noise due to the passive detection employing remnant magnetic fields in the casing. Any changes in the baseline or ambient magnetic fields due to the change in borehole direction is low frequency, easily outside the signal bandwidth of interest for the CJD and therefore filterable.

Permanent magnet based casing collar locators in the prior art suffer from the signal amplitude being dependent on the velocity of the detector. The permanent magnets produce a static magnetic field that follows the low reluctance path of the casing. Return flux to the magnets passes through the receive coils but does not generate a signal (emf) unless the flux changes over time. As the detector traverses along the borehole and approaches the casing collar, the magnetic path changes significantly, causing the return flux to change thereby producing a signal in the receive coil. The amplitude of the signal is proportional to the rate of change of the magnetic flux which is proportional to the rate of change in the magnetic path which is in turn dependent on the velocity of the detector. Again, the present invention employing a magnetometer for the CJD operates purely on a measurement of the static magnetic field inside the casing. There is no dependence on velocity for the signal strength. The present invention is therefore effective in locating a casing joint very accurately at low speeds which is not possible with prior art permanent magnet systems.

Figure 6:
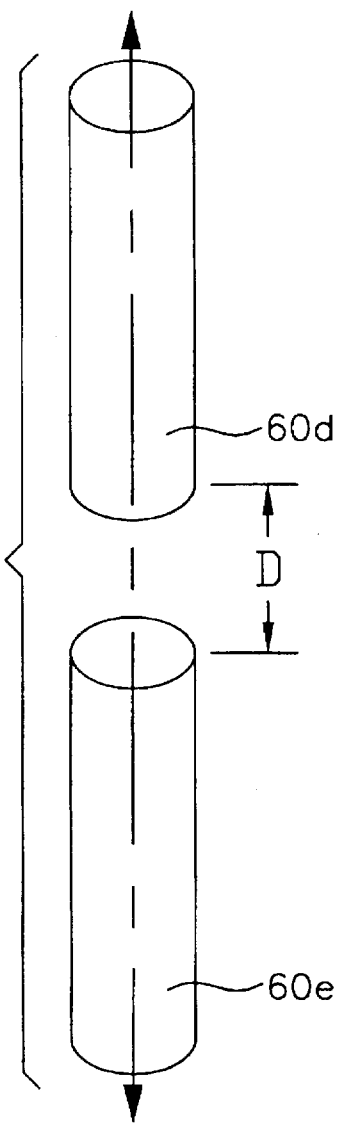
FIG. 6 is a block diagram of an embodiment of the invention employing two magnetometers mounted with sensitive axes along the borehole axis and separated by a defined distance along the axis of the tool.
Figure 7B:
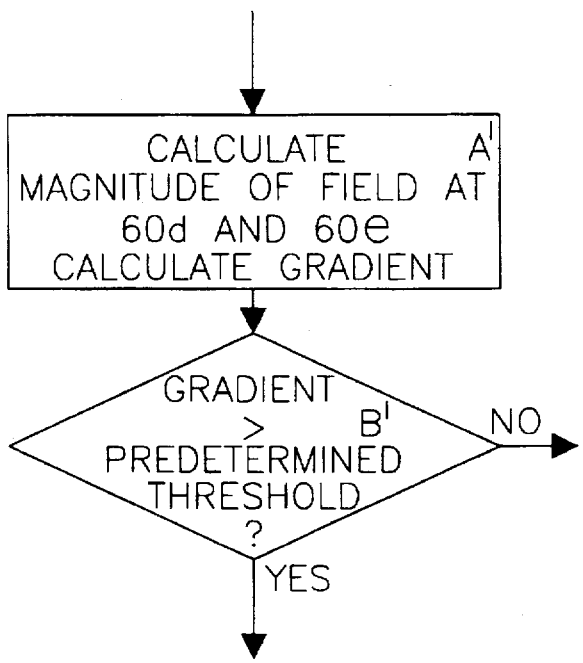
FIG. 7B is a partial flow chart of computer operation for calculation of borehole depth and wireline depth error substituting field gradient calculation and threshold comparison A' and B' for rate of change of field magnitude A and B.

An additional embodiment of the invention is shown in FIG. 6 which shows two magnetometers 60d and 60e mounted in the CJD along the borehole axis separated by a distance D. This embodiment allows for use of an alternative mechanism for detecting the spatial rate of change of the magnetic field in the interior of the casing. The difference in the axial magnetic field is computed over the defined distance D and the gradient computed in terms of nT/in. When this value exceeds a predefined threshold, a collar detection is defined. This alternative embodiment inherently filters the low frequency variations due to changes in borehole direction and other anomalies not indicative of the casing joints. Substitution of gradient calculation and comparison to a predetermined threshold for joint detection is demonstrated in the partial flowchart of FIG. 7B which substitutes blocks A' and B' for blocks A and B of FIG. 7A.

The present invention is also applicable for use in non-magnetic casing tubulars or pipelines by employing a fabricated tracer such as a highly magnetic silicon steel tab mounted at predetermined locations. These tracers provide a substitute for the magnetic anomaly present in a normal metallic casing joint. As shown in FIG. 2A, tab 26 is representative of such a tracer for use with nonmetallic tubing.

Having now described the invention in detail as required by the patent statutes, those skilled in the art will recognize substitutions and modifications to the structure and method disclosed herein. Such substitutions and modifications are contemplated by the invention and contained within its scope as defined in the following claims.

What is claimed is:

1. A method for measuring the distance traveled along a path indexed by magnetic anomalies of known spacing, comprising the steps of:

inserting along a path a plurality of material elements each having magnetic materials creating a magnetic anomaly;

identifying the spacing of the magnetic anomaly for each inserted material element;

traversing a magnetometer along the path;

measuring an output of the magnetometer for magnetic field data;

processing said magnetic field data to detect a change in the magnetic field indicative of each magnetic anomaly;

tallying each detected field change; and computing the distance traveled along the path by summing the known spacing of the magnetic anomalies over the number of tallied field change detections.

2. A method as defined in claim 1 wherein the step of traversing a magnetometer includes aligning a sensitive axis of the magnetometer parallel to an axis substantially along the path to be traversed.

3. A method as defined in claim 2 wherein the step of measuring an output comprises measuring a magnetic field magnitude component along the axis of the path.

4. A method as defined in claim 1 wherein the step of traversing a magnetometer includes aligning a sensitive axis of the magnetometer orthogonal to an axis substantially along the path to be traversed.

5. A method as defined in claim 4 wherein the step of measuring an output comprises measuring a magnetic field magnitude component orthogonal to the axis of the path.

6. A method as defined in claim 3 wherein performed simultaneously with the step of traversing a magnetometer is the step of traversing a second magnetometer along the path including aligning a sensitive axis of the second magnetometer orthogonal to the axis of the path and wherein the step of measuring an output comprises measuring a magnetic field magnitude component along the axis of the path and further comprising the steps of measuring an output of the second magnetometer for magnetic field data comprising a second magnetic field magnitude component orthogonal to the axis of the path.

7. A method as defined in claim 6 wherein performed simultaneously with the step of traversing a magnetometer is the step of traversing a third magnetometer along the path including aligning a sensitive axis of the third magnetometer mutually orthogonal to the axis of the path and to the sensitive axis of said second magnetometer and wherein the step of measuring an output further comprises the step of measuring an output of the third magnetometer for magnetic field data comprising a third magnetic field magnitude component mutually orthogonal to the axis of the path and said second field magnitude component.

8. A method as defined in claims 3, 6, or 7 wherein the processing step comprises:

calculating a magnetic field magnitude;

determining a rate of change of the field magnitude;

declaring a field change indicative of a detected magnetic anomaly when a maximum rate of change is reached.

9. A method as defined in claim 3 wherein performed simultaneously with the step of traversing a magnetometer is the step of traversing a second magnetometer along the path including aligning a sensitive axis of the second magnetometer parallel to the axis of the path and spaced along the axis of the path from the first magnetometer, and wherein the step of measuring an output comprises measuring a magnetic field magnitude component along the axis of the path with the first magnetometer and further comprising the steps of measuring an output of the second magnetometer for magnetic field data comprising a second magnetic field magnitude component along the axis of the path, and further wherein the processing step comprises calculating a gradient of the magnetic field from the output of the first and second magnetometers and declaring a field change indicative of a magnetic anomaly when the gradient exceeds a predefined threshold.

10. A method as defined in claim 1 wherein the step of computing the distance along the path comprises a secondary distance measurement and further comprising the steps of:

reading the distance travelled along the path as determined by a primary distance measuring system; and computing the error in the primary distance measuring system based on the secondary distance measurement.

11. A system for measuring the distance traveled along a path comprising:

a plurality of material elements each having magnetic materials creating a magnetic anomaly inserted along the path at a known spacing;

means for tabulating the spacing of the magnetic anomaly for each inserted material element in a memory;

a tool incorporating a magnetometer, said tool adapted to move along the path;

means for measuring an output of the magnetometer and providing magnetic field data;

means for processing said magnetic field data to detect a change in the magnetic field indicative of each magnetic anomaly;

means for tallying each detected field change; and means responsive to the tallying means for computing the distance traveled along the path by summing the known spacing of the magnetic anomalies stored by the tabulating means in the memory over the number of tallied field change detections.

12. A system as defined in claim 11, wherein the material elements comprise sections of borehole casing.

13. A system as defined in claim 11, wherein the material elements comprise silicon steel tabs adapted for mounting in nonmagnetic material.

14. A system as defined in claim 11, wherein said tool incorporates a second magnetometer and said measuring means additionally measures an output of the second magnetometer.

15. A system as defined in claim 14, wherein the first magnetometer is mounted with an axis of sensitivity substantially aligned with the path and the second magnetometer is mounted in the tool with an axis of sensitivity aligned substantially orthogonal to the path.

16. A system as defined in claim 14, wherein the first magnetometer is mounted in the tool with an axis of sensitivity substantially aligned with the path and the second magnetometer is mounted in the tool with an axis of sensitivity substantially aligned with the path, said second magnetometer displaced along the path from said first magnetometer by a known distance.

17. A system as defined in claim 15, wherein the tool further incorporates a third magnetometer mounted in the tool with an axis of sensitivity substantially orthogonal to the axes of sensitivity for the first and second magnetometers.

18. A system as defined in claim 11, wherein the magnetometer comprises a flux gate magnetometer.

19. A system as defined in claim 11, wherein the magnetometer comprises a proton precession magnetometer.

\* \* \* \* \*

UNITED STATES PATENT AND TRADEMARK OFFICE
CERTIFICATE OF CORRECTION

PATENT NO. : 5,720,345
DATED : February 24, 1998
INVENTOR(S) : Timothy M. Price; Donald H. Van Steenwyk It is certified that error appears in the above-indentified patent and that said Letters Patent is hereby corrected as shown below:

Column 2, line 30, change "Changes" to -- changes --.
Column 3, line 34, change "AP 22" to -- ΔP 22 --.

Signed and Sealed this

Twelfth Day of January, 1999

Attest:

Attesting Officer

*Acting Commissioner of Patents and Trademarks*